Aug. 18, 1942.   G. SLAYTER   2,293,677
ELECTRICAL CABLE COVERING
Filed Dec. 6, 1939

INVENTOR
Games Slayter,
BY
ATTORNEY

Patented Aug. 18, 1942

2,293,677

UNITED STATES PATENT OFFICE 2,293,677

ELECTRICAL CABLE COVERING

Games Slayter, Newark, Ohio, assignor to Owens-Corning Fiberglas Corporation, a corporation of Delaware Application December 6, 1939, Serial No. 307,899

7 Claims. (Cl. 174—102)

The present invention relates to electrical insulation of the type adapted for use in connection with electrical conductors, particularly high tension wires, cables and the like. The invention also relates to a novel method for producing such insulation.

Ordinary insulated wires or cables which are insulated by means of a rubber or similar covering with or without an outer covering of braided fabric of a non-conducting nature frequently have a very short life, especially when the cable is utilized for conducting high voltages in exposed locations as for example on pole lines or in automobile use where the cable comes into contact with objects to which electrical leakage is possible. In the latter instance particularly, difficulty has been encountered due to the tendency of the rubber or other material to absorb oils. Such absorption of oils causes the rubber to swell when heat is encountered with the attendant formation of bubbles or air pockets in the rubber, thus hastening oxidation of the rubber. In addition to this, any electrical discharge occurring through the insulation is attended by the creation of ozone or nascent oxygen in the air pockets within the rubber which is still further conducive toward oxidation of the latter and a still more rapid deterioration of the same.

In connection with wires and cables of the character set forth above, electrical discharge occurs directly from the metallic cable through the rubber or other insulation in a straight path to the source of ground thereby weakening the dielectric strength of the insulation along this path.

The present invention is designed to overcome the limitations that are attendant upon wires and cables of this nature and toward this end contemplates the provision of a wire or cable having an insulating covering of rubber or the like over which there is applied a sheath or covering of braided alkali-free glass yarn or a woven tape which has been treated in one of several manners to render the same semi-conducting. The braided yarn or woven tape fits tightly over the rubber insulation and serves to hold the rubber under compression thus reducing the tendency of the rubber to absorb oils. The net result of this is to preclude the formation of air pockets or bubbles within the rubber so that if an electrical discharge does occur through the insulation, ozone will be formed outside of the outer glass covering instead of inside thereof.

Because of the fact that the outer glass covering is of a semi-conducting nature, a condenser action is set up between the central conductor and the covering so that any tendency for an electrical discharge through the insulation will not be localized between the conductor and the nearest source of ground but will be evenly distributed in all radial directions from the central conductor. Thus a higher dielectric strength for the insulated conductor as a whole is obtained and higher voltages may be carried by the conductor.

While asbestos covered insulated conductors may have limited application for special uses where a conductor of the character set forth above is required, it has been found that the conductance of such material varies with the character of the asbestos employed. Furthermore even when a uniform quality of asbestos is employed for this purpose, conditions of conductivity remain entirely uncontrolled. Whether the asbestos be treated or untreated, the nature of the yarn itself is such that its conductance varies considerably with the humidity encountered, a higher humidity yielding a greater degree of conductivity.

The common alkali glasses, while partially conductive, also have the shortcoming of wide variations in conductance with surrounding conditions, such as humidity.

The principal object of the present invention is to provide an insulated wire having a semi-conducting covering the conductance of which may be accurately predetermined in the manufacturing process and which is uniform in its character and substantially unvarying in use regardless of the humidities or other conditions encountered.

In attaining this object, I utilize alkali-free glass fibers to form the outer covering. In this manner the basic fiber is highly non-conductive and stable with respect to outside conditions. These fibers are then treated to render the same conductive to a predetermined degree and in a manner to render the product highly stable.

The alkali-free glass fibers may be coated with a substance having definite known characteristics of conductance when used as a coating in this manner and thus the finished product when applied to the insulated conductor possesses definite and known values of conductance. Alternatively I may utilize an alkali-free glass to which there has been added as an ingredient of the glass batch a predetermined quantity of a metal salt prior to the attenuation of the same into fibers. The attenuated fibers containing the metal salt may then be treated in a reducing oven at a temperature and for a period of time sufficient to cause a layer of the metal whose salt has been added to form upon the surface of the fiber to render the same as a whole semi-conducting. In this manner, the covering when applied to the conductor possesses definite known characteristics of conductance.

Other objects and advantages of the invention, not at this time enumerated, will become apparent hereinafter.

Figure 1:
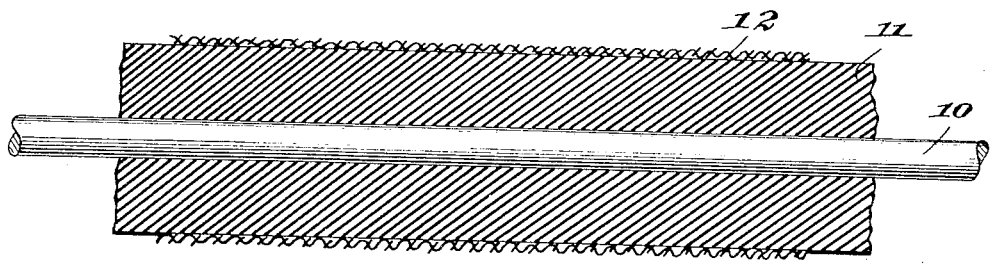
Fig. 1 is a longitudinal sectional view taken through an insulated conductor manufactured in accordance with the principles of the invention, the conductor per se being shown in elevation.

The numeral 10 designates a conductor which has been shown for the sake of illustration as of the single stranded type and which is of any suitable metal as for example copper. Directly on the conductor 10 is a sheath or covering 11 of rubber or other similar material which is preferably maintained under compression by an outer sheath or covering 12 of fabric material, the fibers of which are preferably formed of alkali-free glass and which may be in the form of a seamless braided yarn fabric.

The covering 12 is of a semi-conducting nature and, toward this end, the fibers which cooperate to make up the same may be treated at the outset during their manufacture with colloidal graphite or other suitable conducting material. The graphite or other material may be applied to the filaments in various ways, one being to suspend the graphite particles in water and apply the suspension directly to the filaments as they are attenuated. If desired, a metallic soap or other lubricant may be incorporated with the colloidal graphite in suspension to lubricate the filaments and the lubricated filaments twisted into yarn and braided in the usual manner of braiding directly on the insulation 11. Likewise a suitable binder, as for example a starch solution or the like, may be applied to the filaments immediately after the lubricating process.

Ordinary graphite cannot be used, however, since the particles or flakes are so large in comparison to the fiber diameter, that coating of the fibers is impossible. I have found, however, that colloidal graphite possesses particles sufficiently small that they will adhere to and effectively coat the small individual fibers and accomplish the desired result.

Figure 4:
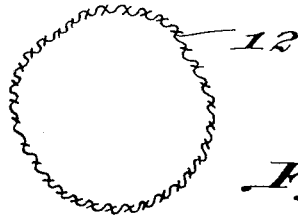
Fig. 4 is a transverse sectional view taken through an improved sheathing material manufactured in accordance with the principles of the invention.
Figure 2:
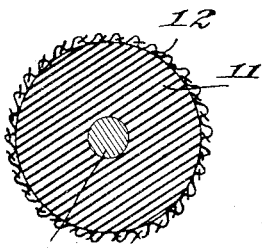
Fig. 2 is a sectional view taken transversely through the insulated conductor.
Figure 3:
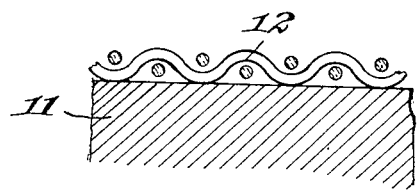
Fig. 3 is an enlarged detailed longitudinal sectional view taken through the conductor in the vicinity of the surface regions thereof.

If desired, the braided sheath 12 may be formed independently and later applied to the insulation as illustrated in Fig. 4. Likewise a woven tape such as is shown at 13 in Fig. 5 having semi-conducting qualities may be constructed from glass filaments which have been coated with a colloidal solution of graphite according to the process set forth above.

Where the sheath 12 or tape 13 is manufactured independently it is desirable to incorporate the colloidal graphite directly in the binder and utilize the graphite-containing binder in the coating apparatus as the filaments are formed. Alternatively however such a binder may be applied to the woven or braided product, for example, by immersion of the product therein. Irrespective however of the manner in which the binder is applied to the filaments, the essential features of the invention are preserved.

Without intending to limit or restrict the invention in any manner whatsoever, one graphite-containing binder that has been found satisfactory for the purpose of coating the filaments is given in the following table:

| | Per cent |
|---|---|
| Globe gum #163 | 5 |
| "Aquadag" (22% colloidal graphite) | 15 |
| "Nopco" #1111 (a starch) | 3 |
| Sorbitol (a sugar) | 1 |
| Water | 76 |

Figure 5:
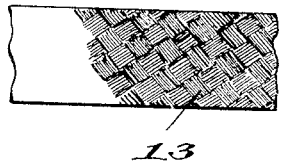
Fig. 5 is a plan view of a fragment of tape also manufactured in accordance with the principles of the invention.

The filaments are coated with a binder of this character, are twisted into yarn, and the yarn either braided into preformed sheathing as shown in Fig. 4 or woven into tape as shown in Fig. 5, and the final product heated in an atmosphere of relatively low humidity to drive off the water content of the binder. The resultant product is of a semi-conducting nature and, when applied to the insulated conductor 10, 11 materially increases the capacity of the conductor.

According to the present invention, an alternative method of producing a tape 13 or sheathing 12 of semiconducting characteristics resides in the utilization of an alkali-free glass to which there has been added a small amount of a suitable metal salt for the attenuation of glass filaments that cooperate to make up the tape. The attenuated filaments may be twisted into yarn, the yarn woven or braided as previously described and the tape or sheathing treated in a reducing oven by means of which the surface regions of the individual filaments are converted to a metallic state.

Various metallic oxides are available for this purpose and their choice is largely a matter of the use of the insulated conductor to which the sheathing or tape is to be applied. For example, a small amount of lead oxide, zinc oxide, or copper oxide, etc. added to the glass batch from which the filaments are formed will produce a sheathing or tape which is resistant to corrosion and which is therefore well adapted for automotive use. A temperature of about 700° F. in the reduction process is suitable for most oxides.

It is to be noted that I prefer to employ an alkali-free glass both in the production of fibers which are coated with the colloidal graphite solution and of fibers which are produced from glass to which there has been added a metallic salt.

Modifications and variations may be resorted to within the spirit and scope of the present invention as defined in the appended claims.

I claim:

1. As an article of manufacture, an electrical conductor, a homogeneous covering of an insulating medium immediately surrounding the conductor, and an outer covering surrounding the insulating medium, said outer covering being formed of yarns each including a multiplicity of alkali-free glass filaments, all of the filaments in said yarns having a coating of highly conducting material thereon of a thinness to impart semi-conducting properties to each fiber and thereby to said yarns and to said outer covering as a whole, the coating on all said filaments throughout said yarns and said covering being substantially uniform over the entire surfaces thereof.

2. A fabric covering for insulated conductors comprising a fabric of alkali-free glass fiber yarns, and a substantially continuous coating of colloidal graphite surrounding all of the individual fibers in the yarns to form a film on each fiber surface of sufficient thinness to impart semi-conducting properties to each fiber and thereby to the yarns and to the fabric as a whole, the coatings on all the fibers of the yarns being substantially uniform over the entire surfaces of the fibers.

3. A braid covering for rubber covered conductors comprised of plaited yarns each composed of a multiplicity of alkali-free glass fibers, said fibers being individually provided with a coating of colloidal graphite and binding material, with said colloidal graphite present in only sufficient amounts to impart semi-conducting properties to each fiber and to said covering as a whole, the coating on all the fibers throughout the individual yarns being substantially uniform over the entire surfaces of the fibers.

4. A fabric covering for rubber covered conductors comprised of interwoven yarns each composed of a plurality of fine glass fibers, the individual fibers having a surface coating of metal to impart semi-conducting properties to said covering, with the metal formed integral with and as a part of the body of the fiber.

5. A semi-conducting covering for insulated conductors comprising a textile fabric of glass fiber yarns each composed of intertwisted fine glass fibers, colloidal particles of a highly conducting material coating the surfaces of the individual fibers to form a film on the surfaces of said fibers of sufficient thinness to impart semi-conducting properties to said fibers, the film on the surfaces of all the fibers of the individual yarns being substantially uniform over the entire surfaces thereof, and binding material on the fiber surfaces to aid in maintaining the coating of conducting material on the fiber surfaces.

6. A semi-conducting covering for an insulated conductor comprising fabric of alkali-free glass fiber yarns, and conducting material coating the surfaces of the individual fibers of said yarns to impart conducting properties to said fibers, said conducting material including a coating of metal on the individual fiber surfaces to impart semi-conducting properties to said fibers, the metal in said coating being integral with and part of the body of the fibers.

7. A semi-conducting covering for an insulated conductor comprising a fabric of yarns individually composed of intertwisted alkali-free fine glass fibers, and colloidal carbonaceous material covering the surfaces of the individual fibers in the yarns throughout said fabric to form a conducting film on each fiber and thereby impart semi-conducting properties to said covering as a whole, the conducting film being uniform over the entire surfaces of all said fibers throughout said yarns.

GAMES SLAYTER.